United States Patent
Riedel et al.

[11] Patent Number: 5,870,698
[45] Date of Patent: Feb. 9, 1999

[54] MULTI-PURPOSE MACHINE METERING/ MONITORING APPARATUS

[75] Inventors: Steven D. Riedel, Eden Praire; Curtis O. Kahleck, Fridley; Allan T. Stewart, Savage, all of Minn.

[73] Assignee: Atrix International, Inc., Burnsville, Minn.

[21] Appl. No.: 850,841

[22] Filed: May 3, 1997

[51] Int. Cl.[6] .......................... G06F 15/20; G06F 15/177
[52] U.S. Cl. .......................... 702/182; 364/130; 364/138; 340/825.16
[58] Field of Search ................. 246/40.1, 40.5; 340/825.06, 825.15, 825.16, 825.23; 702/182; 364/551.02, 146–148, 188–189, 130, 131, 138, 476.01

[56] References Cited

U.S. PATENT DOCUMENTS

| | | | |
|---|---|---|---|
| 4,965,676 | 10/1990 | Ejiri et al. | 358/406 |
| 4,965,742 | 10/1990 | Skeirik | 364/513 |
| 5,084,875 | 1/1992 | Weinberger et al. | 371/291 |
| 5,195,029 | 3/1993 | Murai et al. | 364/184 |
| 5,216,617 | 6/1993 | Kamiguchi et al. | 364/476 |
| 5,229,952 | 7/1993 | Galloway et al. | 364/476 |
| 5,258,918 | 11/1993 | Giancola | 364/476 |
| 5,282,127 | 1/1994 | Mii | 364/130 |
| 5,301,120 | 4/1994 | Magario | 364/476 |
| 5,309,369 | 5/1994 | Kamiguchi et al. | 364/476 |
| 5,325,287 | 6/1994 | Spahr et al. | 364/146 |
| 5,412,779 | 5/1995 | Motoyama | 395/275 |
| 5,518,671 | 5/1996 | Takizawa et al. | 264/40.1 |
| 5,539,650 | 7/1996 | Hehl | 364/476.05 |
| 5,611,975 | 3/1997 | Kamiguchi et al. | 264/40.1 |

Primary Examiner—Kamini Shah

[57] ABSTRACT

An externally mounted, reconfigurable machine metering and monitoring apparatus for selectively metering and monitoring operational status of a predetermined type of machine. The reconfigurable machine metering and monitoring apparatus has a data processor, a data input device in communication with the data processor, an algorithmic software directing the data processor, a data storage unit, wherein discrete data associated with the machine operational status is stored and supplied to the data processor such that the data processor, directed by the algorithmic software, can automatically determine and report the current and historical operating status of the metered/monitored machine. The multi-purpose metering and monitoring apparatus is configurable to selectively meter and monitor the operating status of predetermined types of machines including, but not limited to, an injection molding machine, a blow molding machine, a mill insertion machine, a stuffing machine, a vending machine, an office machine, and other like machines.

10 Claims, 7 Drawing Sheets

MULTI-PURPOSE MACHINE METERING/MONITORING APPARATUS

BACKGROUND OF THE INVENTION

1. Field of the Invention

The present invention relates generally to metering and monitoring systems, and more particularly to a multi-purpose monitoring apparatus which is externally attachable for selective use with injection molding machines, die stamping machines, blow molding machines, mill insertion and/or stuffing machinery, vending machines, copy machines, facsimile machines, duplicating machines, and the like.

2. Description of the Prior Art

Machine monitoring systems familiar to those skilled in the art are generally dedicated to a specific function or set of functions associated with a single type of machine. For example, one type of machine monitoring system known in the art is specifically dedicated to monitoring office machine data. Other types of machine monitoring systems are dedicated to monitoring injection molding machine functional status. Such dedicated machine monitoring systems have disadvantages however, such as the perpetual necessity to completely redesign the associated hardware, firmware and/or software when it is desired to use the same monitoring system for monitoring the operational status of dissimilar types of machines. It is well known for example, that an injection molding machine monitoring system is generally designed to accommodate specific attributes of the particular injection molding machine being monitored, e.g. communications protocols, physical data input mechanisms and/or devices. Furthermore, such dedicated monitoring systems are not easily reconfigured to accommodate future modifications to the machine(s) being monitored. It is therefore advantageous to have a generic machine metering and monitoring apparatus that is easily externally attachable and adaptable for use with more than a single type of machine where it is necessary or otherwise desirable to continuously meter and/or monitor the operational status of the machine (s).

U.S. Pat. No. 5,611,975, issued Mar. 18, 1997, U.S. Pat. No. 5,539,650, issues Jul. 23, 1996, U.S. Pat. No. 5,518,671, issued May 21, 1996, U.S. Pat. No. 5,309,369, issued May 3, 1994, and U.S. Pat. No. 5,301,120, issued Apr. 5, 1994 each disclose methods and apparatus dedicated to injection machine data collection and/or control. U.S. Pat. No. 5,258,918, issued November 1993, U.S. Pat. No. 5,229,952, issued Jul. 20, 1993, and U.S. Pat. No. 5,216,617, issued Jun. 1, 1993 are specifically directed to control and/or management of injection molding machines. U.S. Pat. No. 5,195,029, issued Mar. 16, 1993 and U.S. Pat. No. 4,965,742, issued Oct. 23, 1990, each disclose control systems suitable for controlling injection-molding machines, but which are not easily and efficiently transportable from one machine of interest to another.

U.S. Pat. No. 5,282,127, issued Jan. 25, 1994, to Mii, entitled Centralized Control System For Terminal Device, discloses a centralized control system comprising interface circuits which are provided in respective terminal devices and communications units for transmitting collected information to a remote control device. The system disclosed by Mii is complex and necessarily requires providing each terminal device with a dedicated interface circuit.

U.S. Pat. No. 5,412,779, issued May 2, 1995, to Motoyama, entitled Method And Apparatus For Controlling And Communicating With Business Office Machines, discloses apparatus dedicated for controlling and communicating with business office devices, such as copiers, facsimiles and/or printers and is not easily adapted for use with other types of machines such as manufacturing equipment, e.g. injection molding machines, die stamping machines, and the like which often requires monitoring analog data in contradistinction with the monitored binary data described in the Motoyama patent.

U.S. Pat. No. 5,084,875, issued Jan. 28, 1992, to Weinberger et al., entitled System For Automatically Monitoring Copiers From A Remote location, discloses a system for remotely monitoring the operational status of one or more copy machines having computers integrated therein. The system disclosed by Weinberger et al. is dedicated to remote monitoring of copy machines and necessarily requires a translator device. Thus, the monitoring system disclosed by Weinberger et al. is similar to the system and apparatus disclosed in the '127 and '779 patents in that it is not easily adapted for use with other types of machines, e.g. manufacturing equipment.

U.S. Pat. No. 4,965,676, issued Oct. 23, 1990, to Ejiri et al., entitled Facsimile Remote Diagnostic System is yet another system dedicated for use with a single type of machine, i.e. facsimile apparatus.

What is needed is a generic type of machine metering and monitoring apparatus that is versatile enough to be easily externally attached and adaptable for use with more than a single type of machine, e.g. office machines, industrial/manufacturing machines, and/or commercially applied machines, where it is necessary or highly desirable to continuously monitor the operational status of the machine (s) of interest.

SUMMARY OF THE INVENTION

The present invention is directed to a versatile multi-purpose machine metering and monitoring apparatus capable of monitoring both analog and digital input signals generated by the machine being monitored. The machine monitoring apparatus can selectively be operated as a stand-alone monitor and/or metering device, or alternatively can be combined with additional machine metering/monitoring apparatus on a network. Digital input signals are detected via optically isolated input devices that are configurable to detect counter, level, interval timing or a combination of such signals. Transportability and adaptation of the machine monitoring apparatus is greatly enhanced with reconfigurable memory such as flash EEPROM memory firmware that allows the apparatus to be easily and quickly reprogrammed and upgraded for selective use in metering and/or monitoring specific types of machines. Machine metering and monitoring apparatus versatility is greatly enhanced with hardware capability allowing the user/operator to select a preferred mode of communication, e.g. RS485 network, RS232 port allowing phone modem, power line or RF carrier communication. The machine monitoring apparatus selectively includes a numeric or alpha-numeric keypad having a display such as a touch screen display or LCD display, allowing a machine operator to easily enter and/or monitor desired data, e.g. machine operator numbers, mold numbers, setup times, job status, other defined events, calibration and real-time input data including, but not limited to, pressures, temperatures, cycle counts, cycle durations and parts counts. Using a Windows 95/NT® based algorithmic software, the machine monitoring apparatus can poll each monitoring apparatus integrated on a network for current and stored input data. When used on a network, each machine monitoring apparatus can monitor a particular job status and related machine readings that may be graphically displayed on a system display, either by itself or in combination with data from the other monitors on the network. The displayed data can optionally be stored, thereby allowing it to be transferred to a scheduling system based upon historical and newly entered job variables.

A feature afforded by the present invention is the provision of a versatile machine metering/monitoring apparatus that is selectively applied to industrial and commercial business, office, and manufacturing machines.

Another feature afforded by the present invention is the provision of a versatile machine metering/monitoring apparatus that is selectively used as a stand-alone device or as part of a machine monitoring system on a network.

Yet another feature afforded by the present invention is the provision of a versatile machine metering/monitoring apparatus having both analog and digital input signal monitoring capabilities.

Still another feature afforded by the present invention is the provision of a versatile machine metering/monitoring apparatus that is easy to transport from one machine of interest to another.

Another feature afforded by the present invention is the provision of a versatile machine metering/monitoring apparatus that is easily adapted to communicate with another like machine metering/monitoring apparatus and/or a remote host computer selectively via RS485 networking or alternatively via an RS232 port to implement phone modem, power line or RF carrier communications.

Another feature afforded by the present invention is the provision of a versatile machine metering/monitoring apparatus having reconfigurable input means that can be configured to sense counter, level, interval timing, or a combination of such input signals.

Another feature afforded by the present invention is the provision of a versatile machine metering/monitoring apparatus having upgradeable firmware that is quickly and easily reprogrammable for use with a variety of industrial applications or networked copy control devices with transactional recording.

Still another feature afforded by the present invention is the provision of a versatile machine metering/monitoring apparatus that enables data to optionally be transferred to a scheduling system based on machine historical data and newly entered job variables fora particular machine or family of machines being monitored.

BRIEF DESCRIPTION OF THE DRAWINGS

Other features of the present invention and many of the attendant advantages of the present invention will be readily appreciated as the same becomes better understood by reference to the detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENT

The preferred embodiment described herein below, addresses the long felt need by those in the industrial, commercial and business machine industries to provide a versatile and externally attachable machine metering and monitoring apparatus that is both quickly and easily installed and which further selectively serves as an industrial, commercial and/or a business machine meter/monitor. To date, these issues have not yet been successfully addressed in a single machine monitoring apparatus. The present invention addresses these issues by providing a generic machine metering/monitoring apparatus having re-configurable firmware, multi-purpose input signal ports, and selectable communications interface means integrated into a rugged, light weight and maintenance free externally attached metering and monitoring device.

Figure 1:
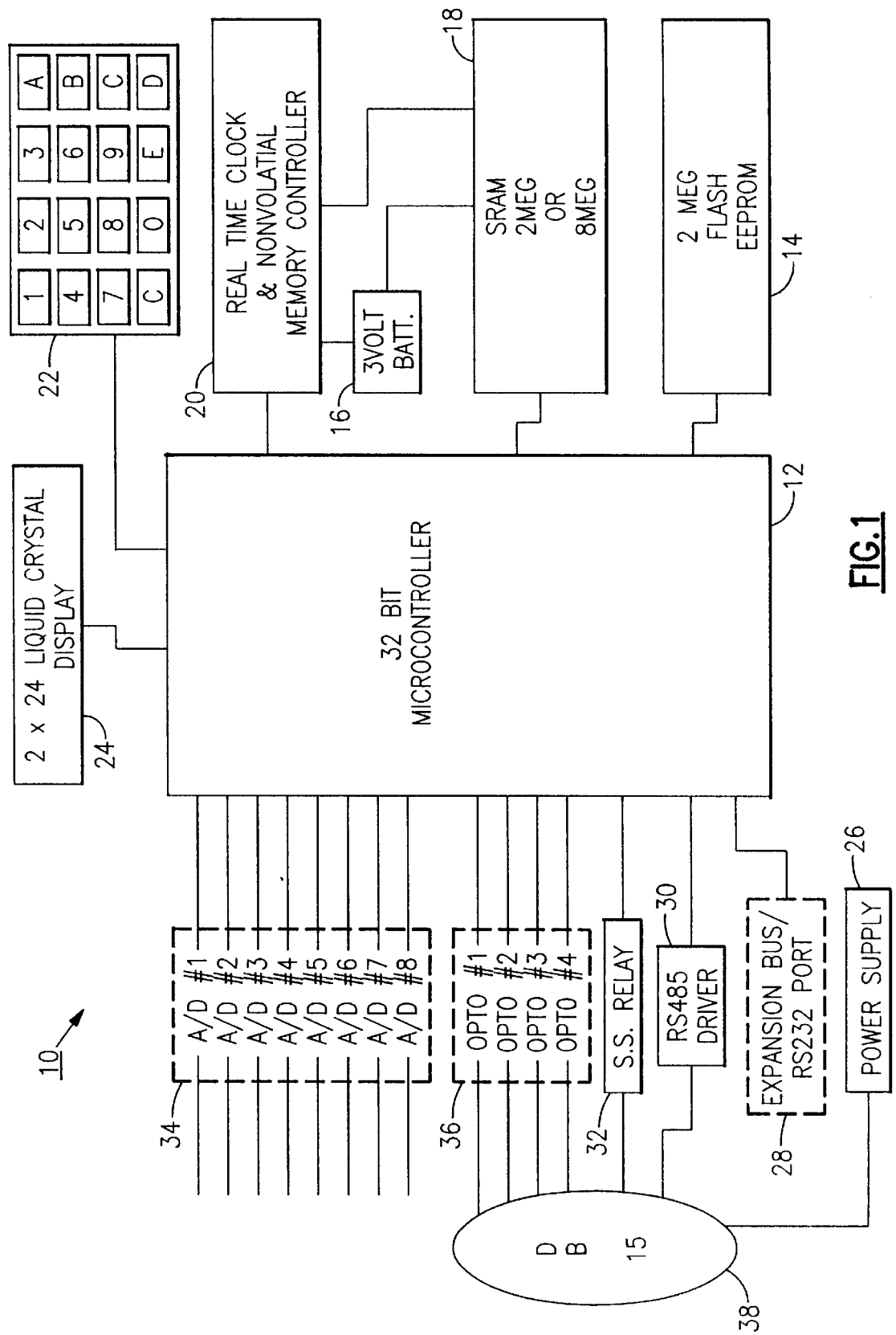
FIG. 1 illustrates a block diagram showing one embodiment of the present inventive multi-purpose machine metering/monitoring apparatus.

Referring now to FIG. 1, a block diagram illustrating one preferred embodiment of the present inventive multi-purpose machine metering/monitoring apparatus 10 is shown. The novel metering/monitoring apparatus 10 most preferably utilizes at least a 32 bit microcontroller 12 to manage the functional interface and communications requirements among the associated elements, e.g. memory 14, 18, real time clock 20, key pad 22, and the like. The present invention is not so limited however, and it will readily be appreciated by those skilled in the art that other types of microcontrollers and microcomputers may also be used to manage the aforesaid interface and communications requirements so long as the required metering/monitoring apparatus 10 functionality is maintained. The metering/monitoring apparatus 10 also includes sufficient, e.g. 2 meg (128×8) or 8 meg (524×8) non-volatile memory 18 such as Static Random Access Memory for storing external stimuli such as cycle count data, transition time data, time stamped events, status data, pressure data, temperature data, user/ operator key pad data, etc. Flash EEPROM 14 is operatively coupled to the microcontroller 12 to provide a metering/monitoring apparatus 10 firmware that is re-programmable and upgradeable to support future machine metering and/or monitoring applications and to increase the scope of machine functions to be metered and/or monitored when necessary or desired. Power for the metering/monitoring apparatus 10 is provided via a 9 VAC, class 2 wall transformer power supply 26, although it shall be understood that many other types of power supplies can be used to provide the required electrical power. A 3 volt battery cell 16 is used to provide a source of back-up power to the non-volatile SRAM 18 in the event electrical power to the metering/monitoring apparatus 10 is unexpectantly and suddenly lost. A real time clock 20 provides the necessary timing functions allowing microcontroller 12 to interface with, e.g. multiplex and poll, other metering/monitoring apparatus 10 devices as well as input signals. The metering/monitoring apparatus 10 most preferably includes an RS485 driver 30 allowing up to 250 metering/monitoring apparatus 10 to share an addressable RS485 communication network. An expansion bus or optional external RS232 communications port 28 can be selectively used to implement phone modem, power line, or RF carrier communications between a plurality of metering/monitoring apparatus 10. Preferably, one or more solid state relays 32 are operatively coupled to the microcontroller 12 to allow a signal to be generated for enabling optional devices such as alarm relays for activating external indicator lights, etc. The metering/monitoring apparatus 10 selectively includes either a numeric or alphanumeric key pad 22 which functions in combination with a display device such as a touch screen display or liquid crystal display (LCD) 24 as illustrated herein to enable communications between a user/operator and the metering/monitoring apparatus 10. Optically isolated inputs 36 are selectively configurable as counter, level, interval timing, or a combination of such signal type inputs to accommodate a plurality of machine types, e.g. industrial, commercial, business, office, etc. Analog/digital inputs 34 accommodate calibration of the metering/monitoring apparatus 10 when configuring usage with a desired machine type. The present invention is not limited to the number or combination of input types shown however, and it will readily be appreciated by those skilled in the art that many different combinations and numbers of optically isolated inputs 36 and analog/digital inputs 34 can also be used to accomplish the desired configurable and versatile functionality when used in combination with the other metering/monitoring apparatus 10 devices as shown in FIG. 1.

Figure 2:
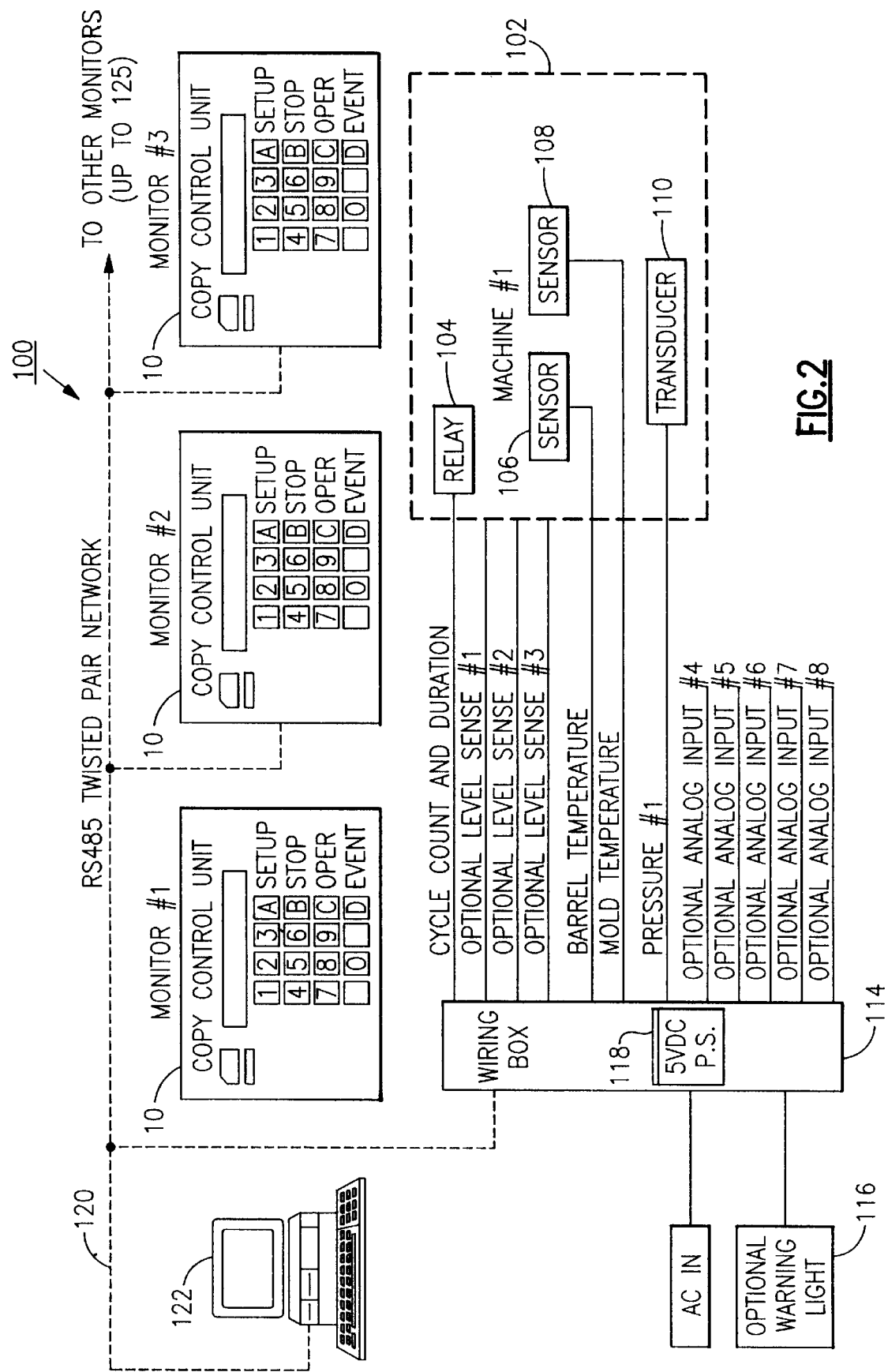
FIG. 2 is a simplified diagram illustrating the metering/monitoring apparatus depicted in FIG. 1 interfaced to a machine of interest.

Moving now to FIG. 2, a simplified diagram illustrating the metering/monitoring apparatus 10 depicted in FIG. 1 is shown interfaced to a machine of interest 102 as well as other like metering/monitoring apparatus 10 and a single user host computer 122 via an RS485 serial network 120. The present invention is not so limited however, and alternative modes of communication can also be used effectively to accomplish the desired functions simply by connecting an alternative communication module to the expansion bus or RS232 port 28 to selectively accommodate modem, power line, or RF carrier modes of communication, as stated herein before. The machine 102 is seen to have a relay 104, temperature sensors such as a barrel temperature sensor 106 and a mold temperature sensor 108, and a pressure transducer 110. Such devices are representative of specific devices that could be found useful and desirable to measurement of certain aspects of an injection molding machine during operation. During operation, the metering/monitoring apparatus 10 will selectively meter and/or monitor, store and report specific data to the host computer 122 when polled. For example, microcontroller 12 can measure the transition time from one falling or rising edge of a low voltage signal to the next falling or rising edge of the same low voltage signal via one or more optically isolated inputs 36 and stored as a time stamped event. Preferably, at least 2 thousand time stamped events can be stored in non-volatile memory 18 before being overwritten with new data. As stated herein before, the optically isolated inputs 36 may selectively be set-up during installation as counters, status, and/or timer inputs.

One analog/digital input 34 is seen connected to an external pressure transducer 110 mounted in the injection molding machine 102. Most preferably, the pressure transducer 110 in connected to the metering/monitoring apparatus 10 via an instrumentation amplifier familiar to those skilled the art of analog signal measurement devices. The present invention is not so limited to the use of instrumentation amplifiers however; and it will readily be appreciated by those skilled in the art that many other types of analog/digital interface devices can also be effectively employed so long as the required functional features of the present invention are maintained. The metering/monitoring apparatus 10 will preferably sample the resultant pressure data and store the associated data in the non-volatile memory 18. Any required calibration of the transducer can be performed by the user/operator via the key pad 22. Alternatively, the analog/digital inputs 34 can selectively be connected to external temperature sensors, e.g. barrel temperature sensor 106, mold temperature sensor 108, mounted in an injection molding machine 102. Signal interfacing between the metering/monitoring apparatus 10 and the respective temperature sensors 106, 108 is preferably accomplished via one or more instrumentation amplifiers, as discussed herein above. Most preferably, the aforesaid instrumentation amplifier(s) will have an adjustable gain between 1 and 10,000 to accomplish the necessary amplification and buffering. The respective temperature data is stored in the non-volatile memory 18 and reported to the host computer 122 when polled. As discussed herein above, calibration of the temperature sensors is accomplished by the user/operator via the key pad 22.

Most preferably, the metering/monitoring apparatus 10 remains in a receive mode when connected on a RS485 network. This allows the metering/monitoring apparatus 10 to efficiently respond to a command from the host computer 122 or another metering/monitoring apparatus 10 coupled to the RS485 network. Most preferably, the metering/monitoring apparatus 10 responds to asynchronous requests for information from the host computer 122. During this communication, some or all the information stored in the non-volatile memory 18 will be uploaded to the host computer 122. Most preferably, the communication flow will always be initiated from the host computer 122 and will function in a command/respond mode where the metering/monitoring apparatus 10 is always responding to requests from the host computer 122.

Versatility of the multi-purpose machine metering/monitoring apparatus 10 is enhanced with pre-wired interface cables configured at one end to interface with the metering/monitoring apparatus 10 without necessitating any modifications, and configured at the opposite end to interface with a particular machine of interest 102. For example, when used on various makes of copy machines having dissimilar options, the pre-wired interface cables will be customized to interface with the analog/digital signals, counter signals, timing signals, event signals, level signals, and the like which are specific to the machine being monitored by the machine user/operator.

Figure 3:
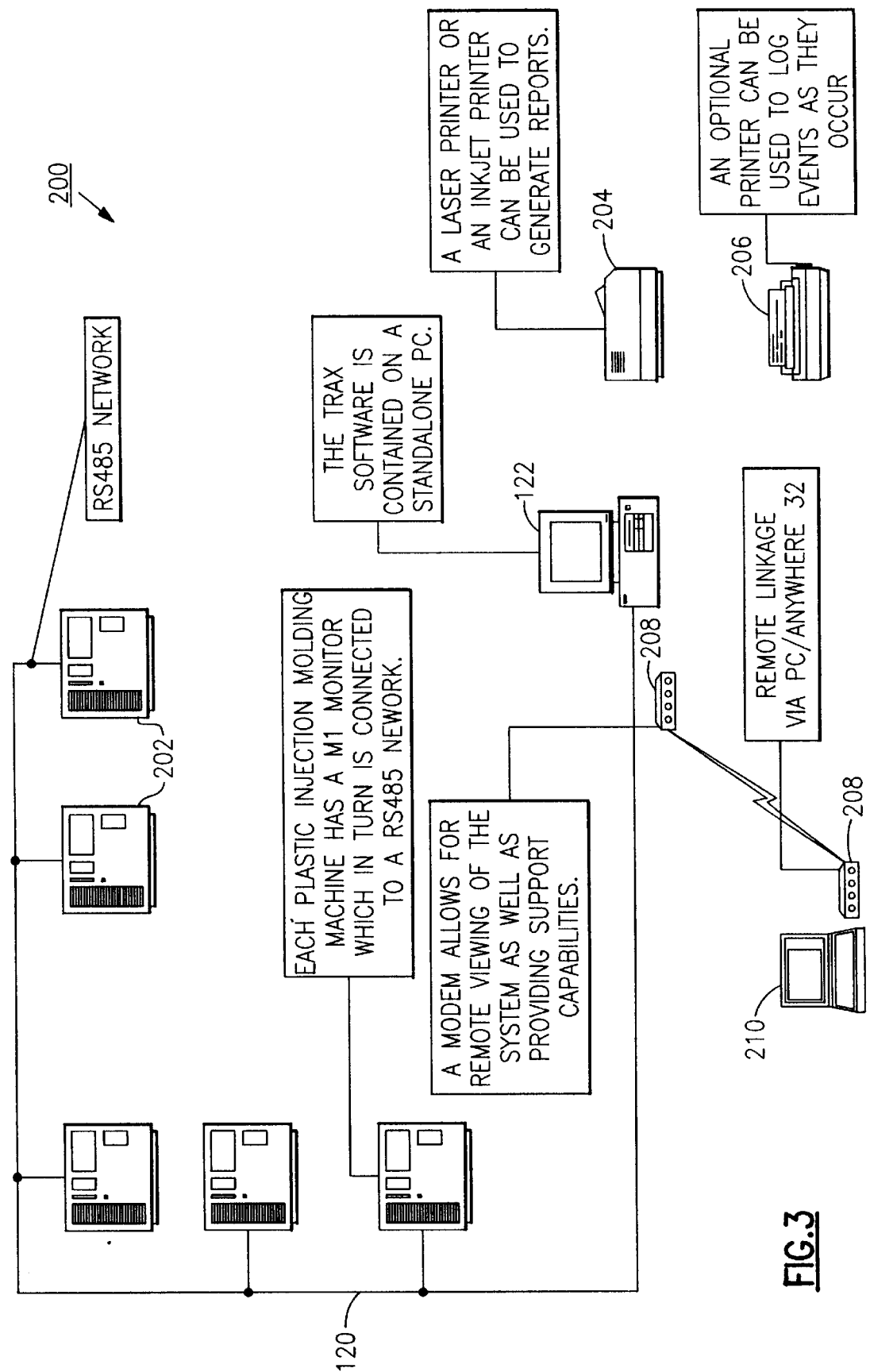
FIG. 3 is a simplified diagram illustrating the metering/monitoring apparatus depicted in FIG. 1 configured to operate on a RS485 network with other like metering/monitoring apparatus allowing a single user/operator to selectively meter and/or monitor a family of injection molding machines.

FIG. 3 is a simplified diagram illustrating the metering/monitoring apparatus 10 depicted in FIG. 1 configured to operate on a RS485 network 120 with other like metering/monitoring apparatus 10 allowing a single user/operator to monitor a family of plastic injection molding machines 202 via a host computer 122. An algorithmic software component directs the system 200 to continuously monitor several vital temperature and pressure components of the plastic injection molding machines 202 via the novel multi-purpose machine metering/monitoring apparatus 10. As stated herein before, the algorithmic software is most preferably contained on the host computer 122 which is limited to a single user/operator. Alternatively, portions or all of the algorithmic software can reside on the machine monitoring apparatus 10. The algorithmic software can be accessed either through the metering/monitoring apparatus key pad 22 or through a modem 208 using remote access through a product such as a lap top computer 210 remotely located. Most preferably, the host computer 122 constantly polls each monitoring apparatus 10 attached to the plastic injection molding machines 202 on the RS485 network 120. In this manner, the monitoring system 200 selectively feeds one or more databases that accumulate information about the performance of the machines 202. Most preferably, this monitoring component is constantly in operation as a task running under WINDOWS 95/NT® software.

One or more interface components between the monitoring component described above and the user/operator (System Supervisor), transfers information from the System Supervisor and forwards this information to the metering/monitoring system 200. Additionally, the one or more interface components will use results of the aforesaid monitoring component to display the status for each machine 202 and provide other desired information in the form of printed reports via a laser printer 204 or other type of printer 206 operationally coupled to the host computer 122. Most preferably, the interface component also runs as a task under WINDOWS 95/NT® software.

The metering/monitoring system 200 algorithmic software comprises preconfigured information as well as set-up information entered by the System Supervisor. For example, the System Supervisor will initially need to enter a list of users allowed to access the system 200, including a security level and password for each user. When used to meter and/or monitor an injection molding machine, a list of all molds expected to be used on any specific machine is preferably entered into a data base, including basic temperatures and pressures, e.g. expected temperature that a mold will require as well as a high/low for each of the metering/monitoring apparatus 10. A description of each type of machine on the system 200 may also be entered by the System Supervisor, including any parameters that would be entered to adjust information entered on any mold potentially used in the system 200.

As the metering/monitoring system 200 is running, it will accumulate data into some of the data bases discussed herein above as well as other databases. This accumulated data can provide historical information as well as information about specific events that occur throughout the system 200. For example, one database, i.e. a common database, would store a history of work that has been completed allowing future comparisons as well as support for future scheduling. Another database or the aforesaid common database would catalog errors that occur during system 200 use and would be used to diagnose system 200 problems. Yet another database or the aforesaid common database would contain an ongoing list of events that exceeded the established temperature and pressure parameters, for example. The System Supervisor can configure the system 200 within specified parameters and will be able to check the relevant data base to ensure the metering and/or monitoring portion of the system 200 is operating properly. The System Supervisor optionally may stop and start the metering and/or monitoring portion of the system 200 and/or may run a set of basic diagnostics on the metering and/or monitoring component described herein. While the metering and/or monitoring component of the algorithmic software is running in the background, the System Supervisor will preferably be able to see the results of the polling on several graphic displays associated with the host computer 122 or other display device operatively coupled to the system 200. The main display may optionally have a grid including an icon relating to the metering/monitoring apparatus 10 connected to each machine on the network 120. For example, each icon preferably indicates whether a particular associated machine is operating within specified temperature and pressure boundaries. The System Supervisor may then simultaneously display information from any or all of the machines connected to the network 120. Most preferably, the main display may show summary and/or status information about each machine on the network 120. Preferably, each machine will have a unique color code assigned to allow a viewer to easily distinguish information associated with a particular machine.

Figure 4:
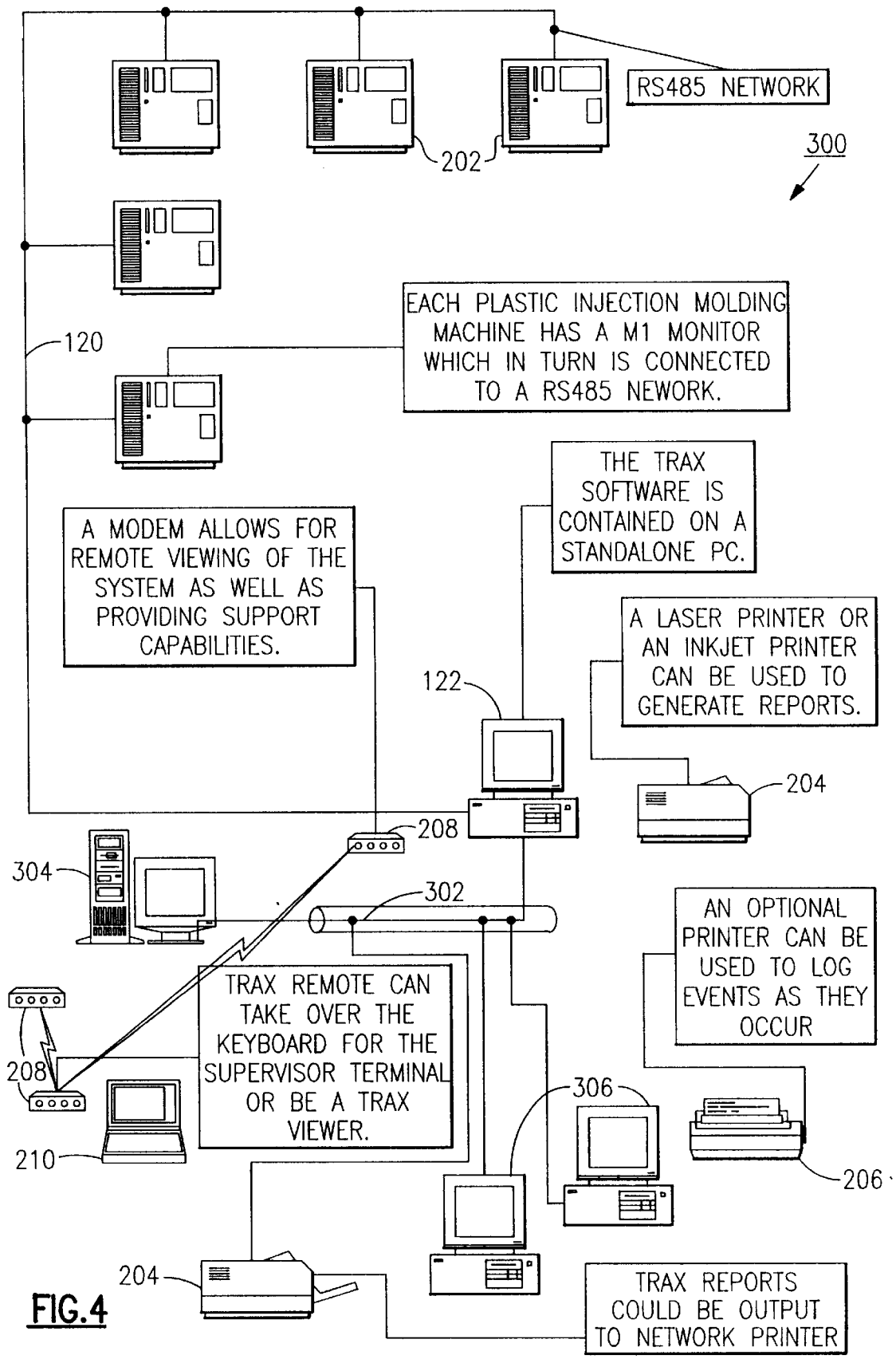
FIG. 4 is a simplified diagram illustrating the metering/monitoring apparatus depicted in FIG. 1 configured to operate on a Novell 3.1 based network with other like metering/monitoring apparatus allowing multiple users on the Novell 3.1 based network to act as viewers.

FIG. 4 is a simplified diagram illustrating the metering/monitoring apparatus 10 depicted in FIG. 1 configured to operate on a Novell 3.1 based network 302 with other like metering/monitoring apparatus 10, allowing multiple users on the Novell 3.1 based network 302 to act as viewers. The addition of a Novell 3.1 based network 302 provides for implementation of a system 300 configuration wherein any data bases associated with the host computer 122 are also contained on the network 302 and thereby accessible by additional viewers operatively connected into the system 300. Most preferably, the connection to the RS485 network 120 remains at the host computer 122 such that any capability to change information or modify system configuration remains solely with the host computer 122. It can easily be seen that the aforesaid feature is achieved by allowing system viewers access to the system 300 through a modem 208 that is connected to a network server 304 rather than the host computer 122. However, the algorithmic software provides for simple import and export of data across the network 302 to allow generation of ASCII text files and support scheduling, for example.

Figure 5:
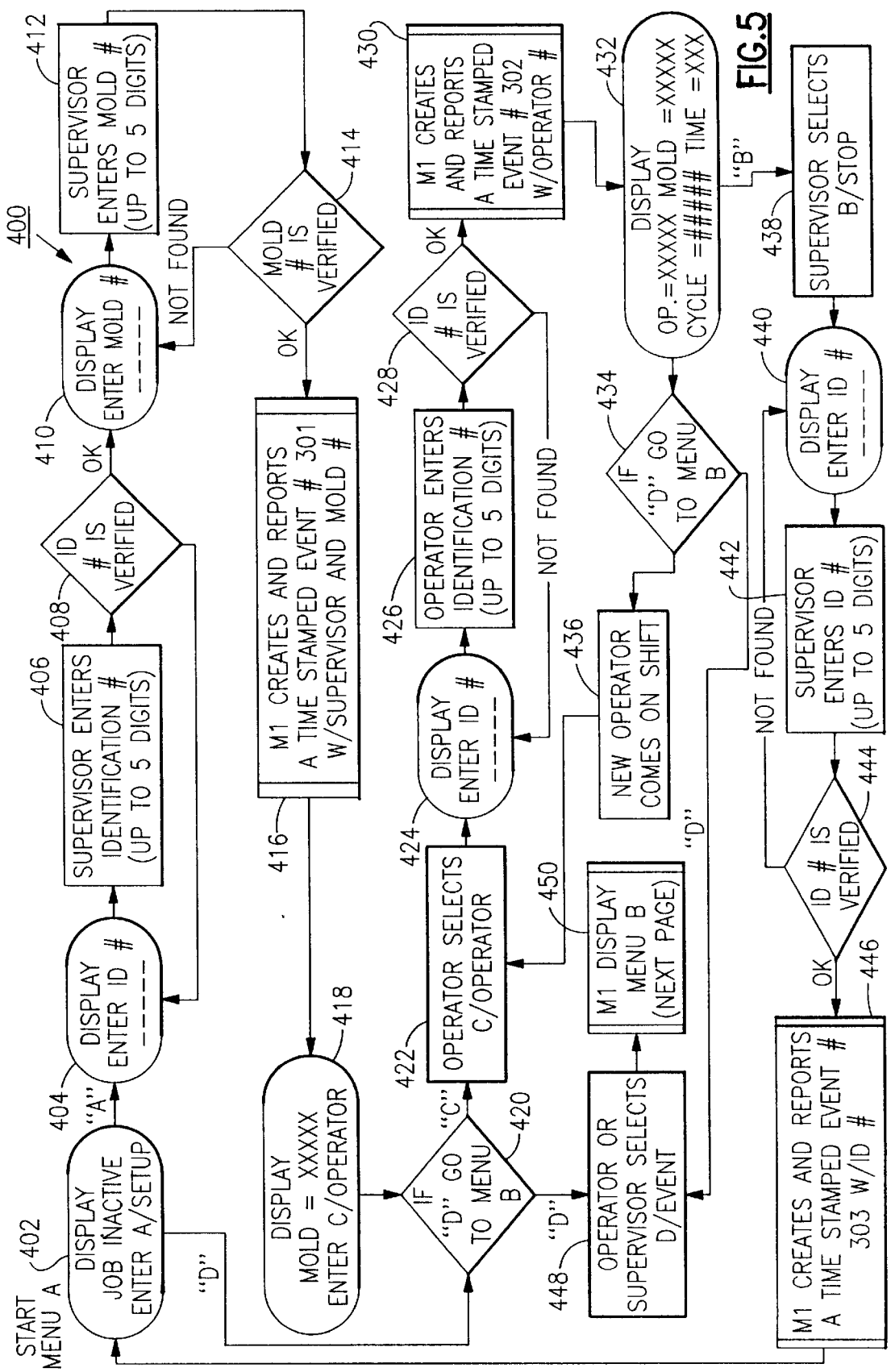
FIG. 5 is a flow chart illustrating keypad communications between the metering/monitoring apparatus depicted in FIG. 1 and a System Supervisor (user/operator) to initially setup and activate selected metering/monitoring apparatus.

Moving now to FIG. 5, a flow chart illustrating one embodiment of the novel algorithmic software enabling keypad communications between the metering/monitoring apparatus 10 depicted in FIG. 1 and a System Supervisor (user/operator) to initially setup and activate selected metering/monitoring apparatus 10 is shown. Activating the metering/monitoring apparatus 10 initializes the apparatus 10 and "job inactive" "enter A/setup" is displayed on the liquid crystal display 24 as shown in box 402. Most preferably, the metering/monitoring apparatus key pad 22 can only respond to a System Supervisor (user/operator) input when a new job is started, events are entered, or when displaying readings. Upon pressing the "A/setup" key, the display 24 indicates that the System Supervisor must enter and ID number as shown in box 404. The System Supervisor then enters an ID number as shown in box 405 which is subsequently validated or invalidated by the metering/ monitoring apparatus 10, as shown in box 408. When the machine being monitored is a mold machine, the apparatus display 24 will prompt the System Supervisor to enter a mold number as shown in box 410. The System Supervisor then enters a mold number as shown in box 412 that is verified by the metering/monitoring apparatus 10 as shown in box 414. Upon successful verification of the System Supervisor ID number and a proper mold number, the metering/monitoring apparatus 10 will generate a time stamped event comprising a data string including the aforesaid ID number and mold number as shown in box 416. At this time, the display will enter its set-up mode where the display 24 prompts a user/operator to push the "C/operator" key to start a new job as shown in boxes 418 and 422, or alternatively, to push the "D/event" key creating a new menu to be displayed for analog and cycle time outputs as shown in boxes 420, 448 and 450. Details of the "D/event" menu will be discussed herein below. Selecting the "C/operator" key prompts the user/operator to enter an operator ID number as shown in box 424. The metering/monitoring system 10 proceeds to verify whether the operator ID number entered is a valid number as shown in boxes 426 and 428. Successful entry of a valid operator ID number prompts the apparatus 10 to create and report yet another time stamped event including a new event number and the operator ID number and puts the metering/monitoring apparatus 10 in its run mode waiting for the "C/operator" key to be pressed for a new machine operator, the "D/event" key to be pressed to see inputs, enter events or input part count at the end of the work shift, or the "B/stop" key to be pressed and close out the current job as shown in boxes 432, 434 and 436. The entire process described herein above is then reinitialized following entry and verification of a valid System Supervisor ID number at the end of the work shift, as shown in boxes 438, 440, 442, 444 and 446.

Figure 6:
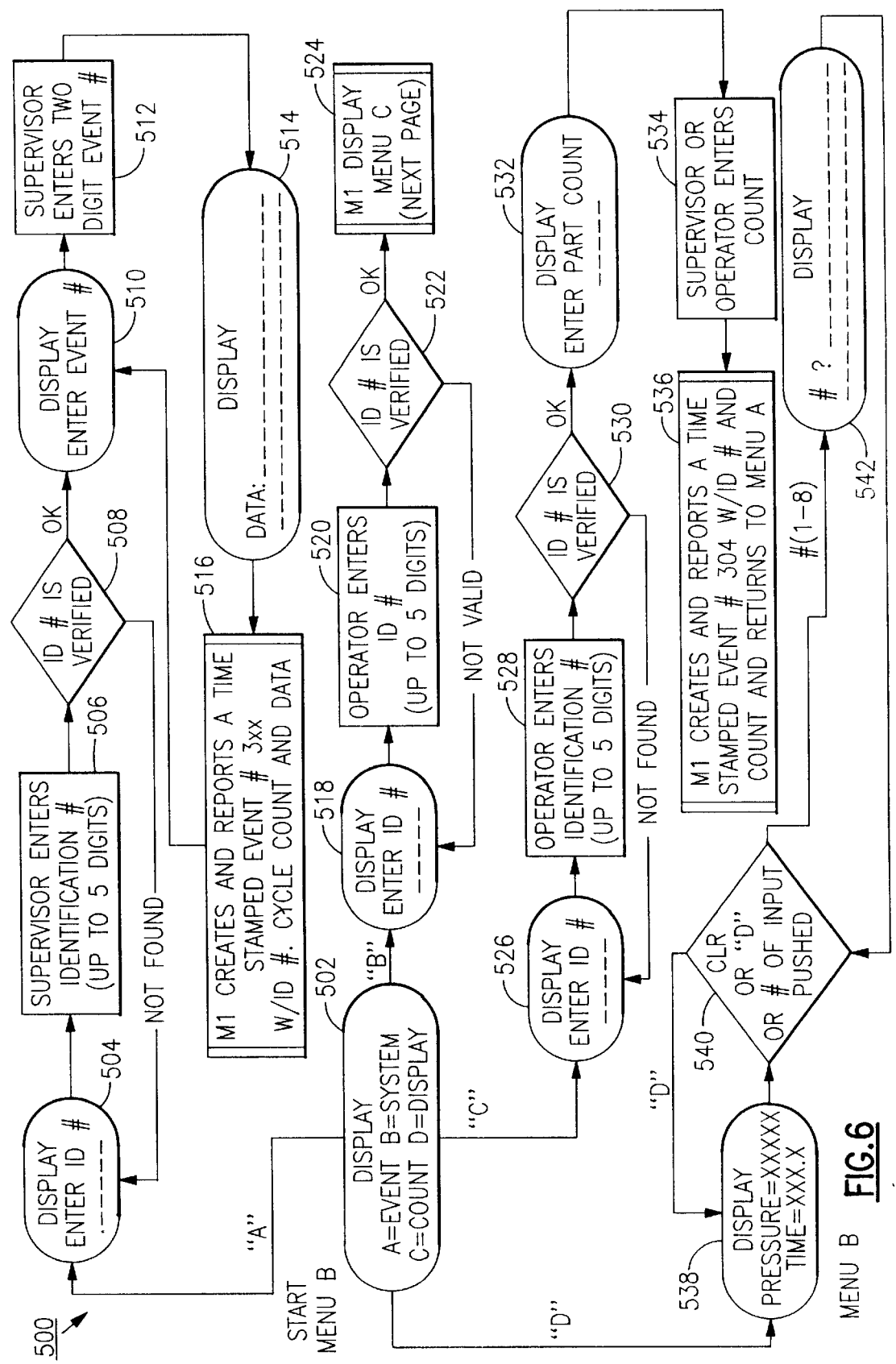
FIG. 6 is a flow chart illustrating keypad communications between the metering/monitoring apparatus depicted in FIG. 1 and a System Supervisor (user/operator) to retrieve specified machine operational data.

FIG. 6 is a flow chart illustrating key pad 22 communications between the metering/monitoring apparatus 10 depicted in FIG. 1 and a System Supervisor (user/operator) to retrieve specified machine operational data. For example, pushing the "D/event" button as shown in box 448 in FIG. 5 prompts the user/operator to push the "A=event", "B=system", "C=count", or the "D=display" button on the apparatus key pad 22 as shown in box 502.

When the A/event button is pushed, the metering/ monitoring apparatus 10 prompts the System Supervisor to enter a valid ID number as shown in box 504. Following entry of a valid ID number as shown in box 506, the metering/monitoring apparatus 10 proceeds to verify the ID number as shown in box 508 and prompt the System Supervisor to enter an event number as shown in box 510. Following entry of a valid ID number and a proper event number, the System Supervisor can optionally enter additional data as shown in box 514. Upon completion of the aforesaid ID number, event number and data entry process, the metering/monitoring apparatus 10 creates and reports a time stamped event including and event number, the System Supervisor ID number, cycle count and data as shown in box 516.

Pushing the B/system button prompts the machine user/ operator to enter a valid ID number that is subsequently verified by the metering/monitoring apparatus 10 as shown in boxes 518, 520 and 522. Successful entry of the aforesaid user/operator ID number activates a new menu (Menu C) on the display 24 as shown in box 524. Details of the Menu C display will be discussed in detail herein below.

Pushing the C/count button also prompts the machine user/operator to enter a valid ID number that is subsequently verified by the metering/monitoring apparatus 10 as shown in boxes 526, 528 and 530. Upon successful entry of the aforesaid user/operator ID number, the metering/monitoring apparatus 10 prompts the System Supervisor or user/ operator to enter a part count as shown in boxes 532 and 534. The metering/monitoring apparatus 10 then creates and reports a new time stamped event number including the entered ID number and count number as shown in box 536 and proceeds a return to the A/set-up menu described herein above.

When the D/display button is pushed, a pressure sensor reading is displayed in real time on the display 24 as shown in box 538. Most preferably, the pressure data is also generated at the metering/monitoring apparatus RS232 output port 30 for display on a palm top computer, lap top computer, tester use, and the like. Pushing a number button such as shown in box 540 displays a description field that is set up at the host computer 122 as well as a real time measurement of an analog signal input corresponding to the input line number pushed, as shown in boxes 540 and 542.

Figure 7:
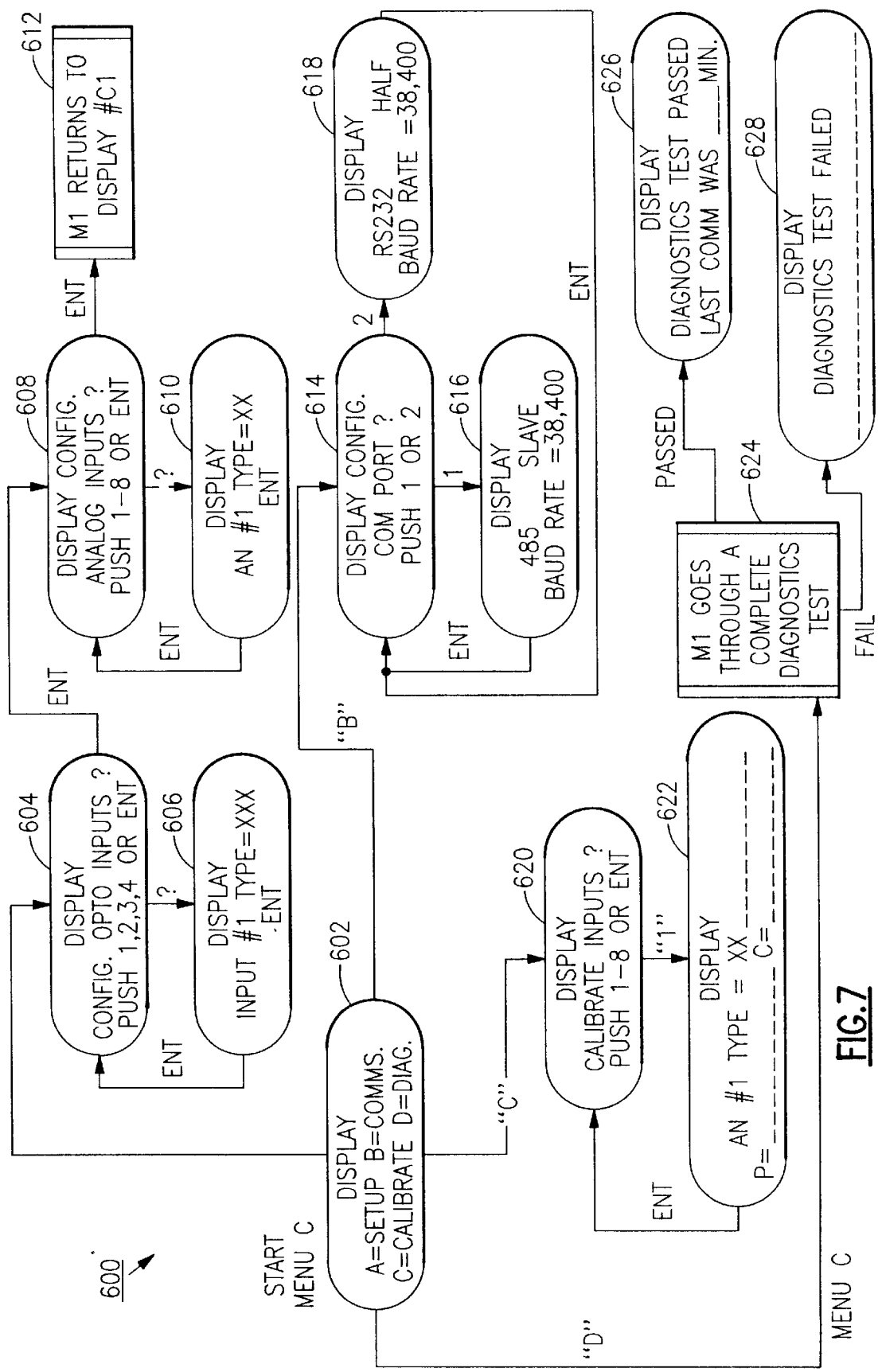
FIG. 7 is a flow chart illustrating keypad communications between the metering/monitoring apparatus depicted in FIG. 1 and a System Supervisor (user/operator) to perform calibration and diagnostic testing of selected metering/monitoring apparatus.

FIG. 7 is a flow chart illustrating key pad 22 communications (Menu C) 600 between the metering/monitoring apparatus 10 depicted in FIG. 1 and a System Supervisor and/or user/operator to perform metering and/or monitoring system configuration, calibration and diagnostic testing of selected metering/monitoring apparatus 10. Menu C displays a choice of four sub-menus, "A=set-up," "B=comms," "C=calibrate," and "D=diag" as shown in box 602. Pushing the A/set-up menu key prompts a user/operator or System Supervisor to configure each opto-isolated input 36 and each analog input 34 as a particular type based upon options set-up at the host computer 122, as shown in boxes 604, 606, 608 and 610. Upon completion of the input data, the metering/monitoring apparatus 10 automatically returns to the Main Menu C, ready for selection of a different submenu or re-selection of the A/set-up configuration menu.

Pushing the B/comms menu key prompts a user/operator or System Supervisor to configure each communication port 28, 30 as shown in boxes 614, 616 and 618. During this configuration process, the Baud rate and status of each communication port 28, 30 may be configured as what type it is based upon options set up at the host computer 122. For example, com port 1 (RS485 driver) 30 will most preferably default to RS485 as shown in box 616, and the Baud rate set up at the host computer 122. It will be understood the present invention is not so limited and that these parameters can be adjusted for troubleshooting reasons or a variety of other reasons, if so desired however. The corn port 1 (30) status can also be selectively configured as a slave or master for polling other slaves. Similarly, the Baud rate and duplex for corn port 2 (RS232 port) 28 are changeable as desired during the portion of the configuration process shown in box 618.

Pushing the C/calibrate menu key prompts a user/operator or System Supervisor to select a desired input 34, 36 to be calibrated as shown in box 620. For example, a selected input 34, 36 can be calibrated by entering two points from an external source and calibrating associated display 24 readouts through entry of correlation data via key pad 22 as shown in box 622. Pushing the D/diag menu key instructs a selected metering/monitoring apparatus 10 to perform a self-diagnostic routine as shown in box 624. Most preferably, results of the diagnostic routine, pass/fail will be displayed on the apparatus display 24 along with descriptive information about possible metering/monitoring apparatus 10 problems that may have occurred in the event of a failure.

This invention has been described herein in considerable detail in order to provide those skilled in the art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing from the spirit and scope of the present invention, as defined in the claims which follow.

We claim:

1. An externally mounted machine metering and monitoring apparatus for selectively metering and monitoring operational characteristics of a predetermined type of machine, said apparatus comprising:

a data processor;

a data input device in communication with said data processor;

a reconfigurable algorithmic software directing said data processor;

a data storage unit, wherein discrete data associated with said machine operational characteristics is stored and supplied to said data processor such that said data processor, directed by said algorithmic software, can automatically determine and report at least one of a current and a historical status of said machine operational characteristics;

at least one reconfigurable communication port configured to selectively provide bi-directional data communication between said machine apparatus and any device selected from the group consisting of a remote computer, a host computer, at least one other machine apparatus and any combination thereof via any communication medium selected from the group consisting of a modem, a power line, an expansion bus, a radio frequency carrier signal and any combination thereof;

at least one interface cable operationally coupling said metering and monitoring apparatus to said predetermined type of machine, said at least one interface cable being adaptable to operationally couple said metering and monitoring apparatus to at least one of an injection molding machine, a blow molding machine, a mill insertion machine, a stuffing machine, a vending machine, and an office machine; and a reconfigurable storage device for storing said algorithmic software, wherein said reconfigurable storage device is adaptable to store at least one of a new algorithmic software and a modified algorithmic software, that directs said metering and monitoring apparatus function in combination with a different predetermined type of machine, and wherein said reconfigurable storage device is adapted to selectively receive said new algorithmic software via any device selected from the group consisting of said machine apparatus, said remote computer, said host computer and any combination thereof.

2. The externally mounted machine metering and monitoring apparatus of claim 1 further comprising a combination of optically isolated signal input ports and analog/digital signal input ports, wherein said optically isolated signal input ports are configurable to accept count signals, level detector signals, interval timer signals, and combinations of said count signals, level detector signals, and interval timer signals, and wherein said analog/digital signal input ports are configurable to accept temperature sensor signals, pressure sensor signals-and digitized data.

3. A system for selectively metering and monitoring operational characteristics of a plurality of predetermined types of machines, said system comprising:

a plurality of externally mounted machine metering and monitoring apparatus, wherein each apparatus within said plurality of apparatus comprises:

a data processor;

a data input device in communication with said data processor;

an algorithmic software directing said data processor;

a data storage unit, wherein discrete data associated with said machine operational characteristics for a single predetermined type of machine is stored and supplied to said data processor such that said data processor, directed by said algorithmic software, can automatically determine and report at least one of a current and a historical status of said machine operational characteristics for said single predetermined type of machine;

at least one reconfigurable communication port configured to selectively provide bi-directional data communication between each machine metering and monitoring apparatus and any device selected from the group consisting of a remote computer, a host computer, at least one other machine metering and monitoring apparatus and any combination thereof via any communication medium selected from the group consisting of a modem, a power line, an expansion bus, a radio frequency carrier signal and any combination thereof;

at least one interface cable being adaptable to operationally couple said metering and monitoring apparatus to at least one of an injection molding machine, a blow molding machine, a mill insertion machine, a stuffing machine, a vending machine, and an office machine; and a reconfigurable storage device for storing said algorithmic software, wherein said reconfigurable storage device is adaptable to store at least one of a new algorithmic software and a modified algorithmic software, that directs said metering and monitoring apparatus to function in combination with a different predetermined type of machine, and wherein said reconfigurable storage device is configured to selectively receive said new algorithmic software and said modified algorithmic software via any device selected from the group consisting of said at least one other machine apparatus, said remote computer, said host computer and any combination thereof.

4. The system of claim 3 wherein each externally mounted machine metering and monitoring apparatus within said plurality of externally mounted machine metering and monitoring apparatus further comprises a combination of optically isolated signal input ports and analog/digital signal input ports, wherein said optically isolated signal input ports are configurable to accept count signals, level detector signals, interval timer signals, and combinations of said count signals, level detector signals, and interval timer signals, and wherein said analog/digital signal input ports are configurable to accept temperature sensor signals, pressure sensor signals and digitized data.

5. The system of claim 4 wherein said plurality of externally mounted machine metering and monitoring apparatus are operationally coupled to a host computer via a first communication network and further coupled to at least one independent remote computer via a second communication network, wherein said host computer is adapted to reconfigure predetermined operational characteristics of said plurality of externally mounted machine metering and monitoring apparatus, and wherein said at least one remote computer is adapted to solely and independently monitor predetermined system activities.

6. The system of claim 5 further comprising a wiring termination device, wherein each externally mounted machine metering and monitoring apparatus within said plurality of externally mounted machine metering and monitoring apparatus is operationally coupled to a single predetermined type of machine to be selectively metered and monitored via said wiring termination device.

7. An externally mounted, reconfigurable machine metering and monitoring apparatus for selectively metering and monitoring operational characteristics of a predetermined type of machine, said apparatus comprising:

data processing means for processing data;

data entering means for communicating with said data processor;

algorithmic software prompting means for directing said data processor, wherein said algorithmic software prompting means prompts and instructs a system manager such that said system manager can reconfigure said machine metering and monitoring apparatus to function solely with predetermined personnel;

data storing means for storing discrete data associated with said machine operational characteristics and further supplying said discrete data to said data processor such that said data processor, directed by said algorithmic software prompting means, can automatically determine and report at least one of a current and a historical status of said machine operational characteristics, and at least one reconfigurable communication port configured to selectively provide bidirectional data communication between each machine metering and monitoring apparatus and any device selected from the group consisting of a remote computer, a host computer, at least one other machine metering and monitoring apparatus and any combination thereof via any communication medium selected from the group consisting of a modem, a power line, an expansion bus, a radio frequency carrier signal and any combination thereof.

8. The externally mounted, reconfigurable machine metering and monitoring apparatus of claim 7 further comprising interfacing means for operationally coupling said metering and monitoring apparatus to said predetermined type of machine, said interfacing means being adaptable to operationally couple said metering and monitoring apparatus to at least one of an injection molding machine, a blow molding machine, a mill insertion machine, a stuffing machine, a vending machine, and an office machine.

9. The externally mounted, reconfigurable machine metering and monitoring apparatus of claim 8 further comprising a reconfigurable storage means for storing algorithmic software, wherein said reconfigurable storage means is adaptable to store reconfigured algorithmic software that directs said metering and monitoring apparatus to function in combination with a different predetermined type of machine, and wherein said reconfigurable storage means is capable of selectively receiving said reconfigured algorithmic software via any device selected from the group consisting of said machine apparatus, said remote computer, said host computer, said at least one other machine metering and monitoring apparatus and any combination thereof.

10. The externally mounted, reconfigurable machine metering and monitoring apparatus of claim 9 further comprising a combination of reconfigurable optically isolated sensing means for sensing count signals, level detector signals, interval timer signals, and combinations of said count signals, level detector signals, and interval timer signals and reconfigurable analog/digital sensing means for sensing temperature sensor signals, pressure sensor signals and digitized data.

* * * * *